Oct. 25, 1927.  
L. H. RICHMOND  
1,646,874  
SOUND DETECTION TRAINING DEVICE  
Filed July 24, 1926  
2 Sheets-Sheet 2
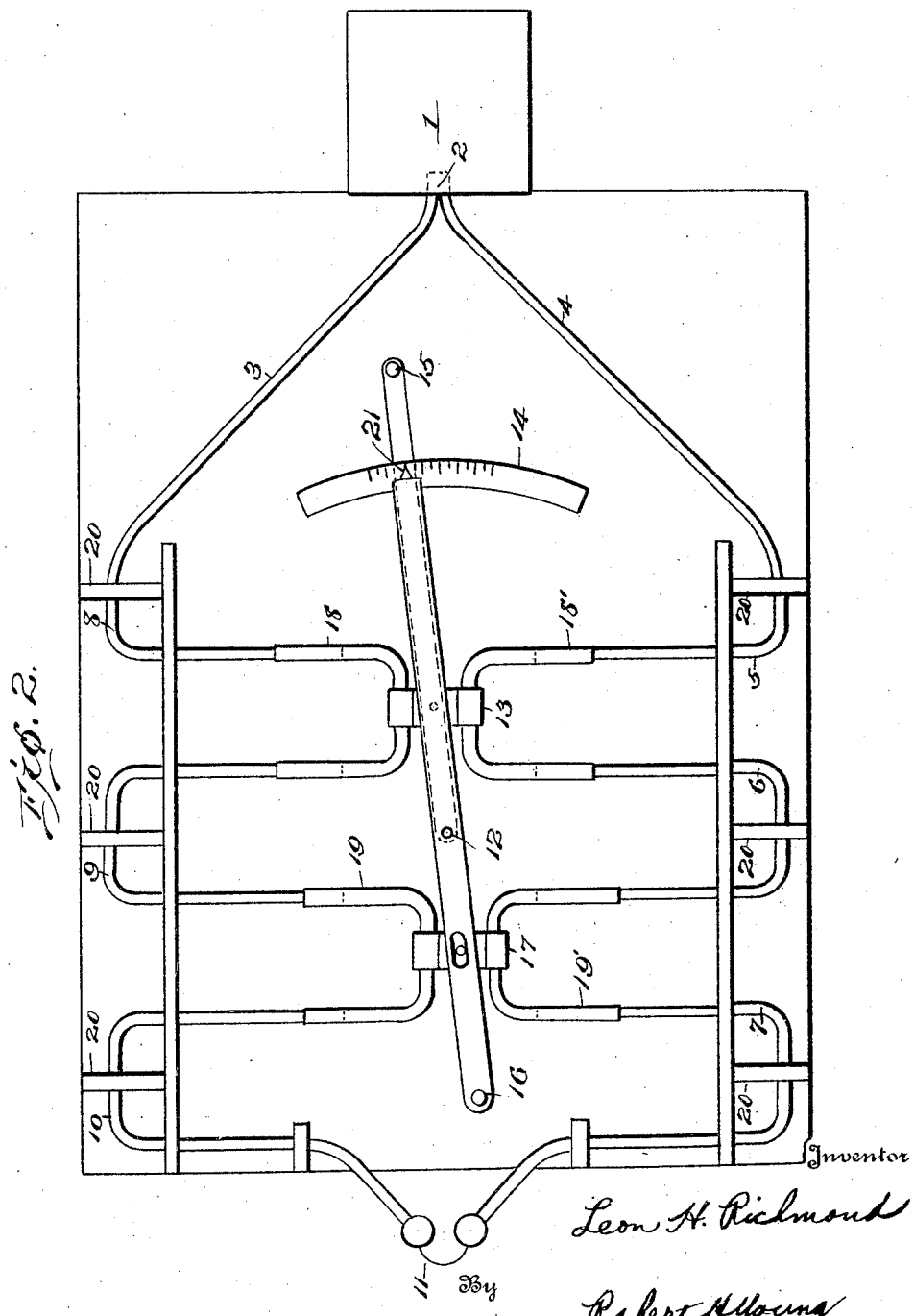

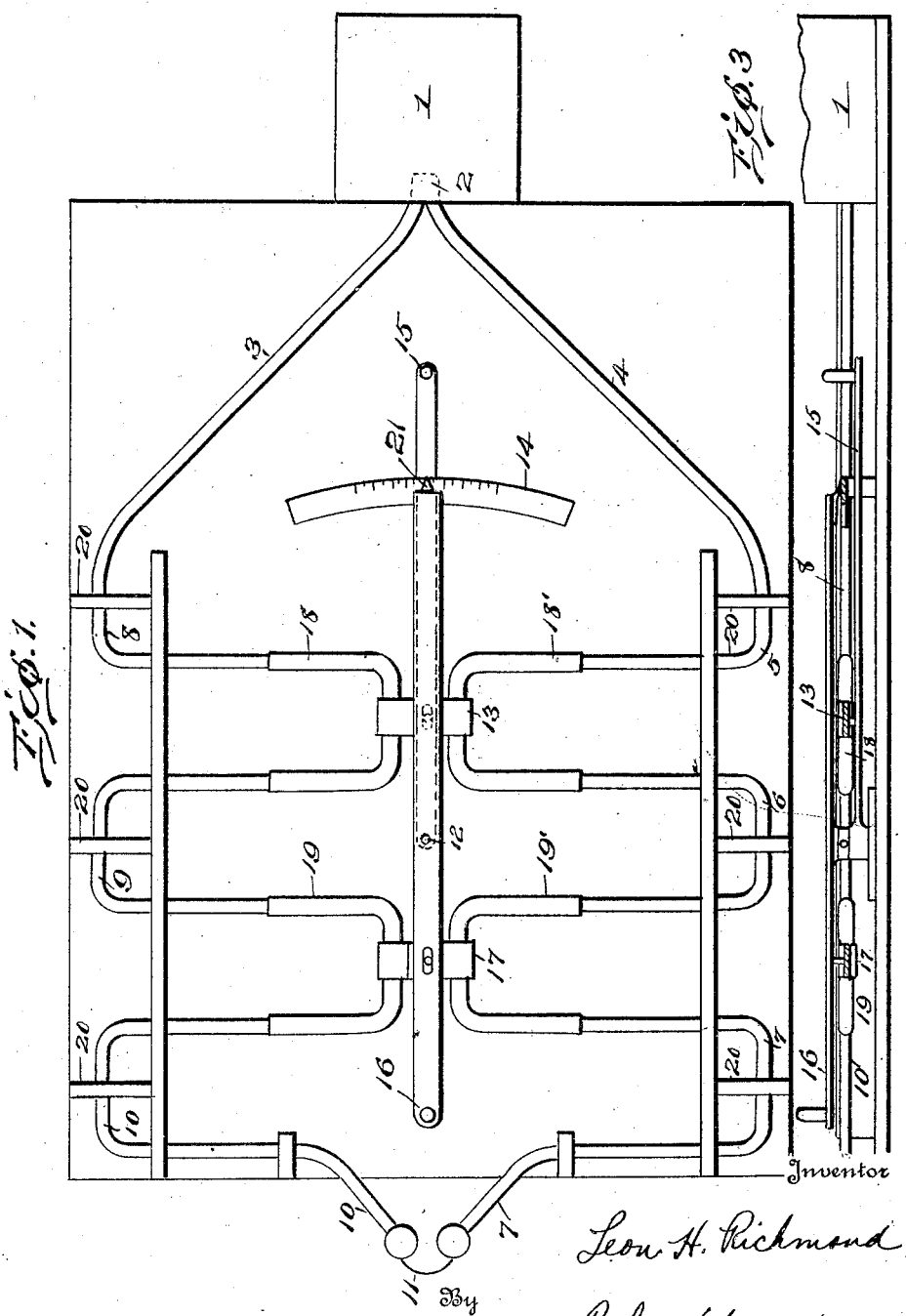

Patented Oct. 25, 1927.

1,646,874

UNITED STATES PATENT OFFICE.

LEON H. RICHMOND, OF FORT H. G. WRIGHT, NEW YORK.

SOUND-DETECTION-TRAINING DEVICE.

Application filed July 24, 1926. Serial No. 124,771.

This invention relates to a laboratory apparatus for the testing and training of an individual's binaural sense or the degree of equality of sound detection of one ear with respect to the other.

An object of my invention is to provide such an apparatus that will allow of the transmission of sound from a single source to each ear of the pupil, the apparatus being so constructed that the instructor may secretly so operate the same that the distances of travel of the sound to the two ears is unequal; and that the pupil may also independently reset the apparatus at a position in which in his judgment as a result of his binaural sense alone, the sound is reaching both ears simultaneously.

Another object of my invention is to provide the apparatus with indicating and recording devices whereby the degree of accuracy of the pupil's observations may be definitely determined in order to test and train his ability at this particular type of sound detection.

To this end I propose to employ an apparatus comprising a system of tubing to divide the path of the sound in two paths each of which is variable in length. The sound reaches the respective ears through the two paths and when those paths are of equal length, the sound at the two ears is equal both in phase and intensity, thus giving a binaural setting in a median plane. Means are provided for the length of path to be changed by a recorder and this length of path to be equalized by an observer who is being trained or tested and who uses his binaural sense to determine when the paths are equal the exactness with which the paths are equalized in length by the observer is a measure of his accuracy.

With the foregoing and other objects in view, the invention consists in the combination of parts and in the details of construction hereinafter set forth in the description and appended claims, certain preferred embodiments thereof being illustrated in the accompanying drawings, in which:

Fig. 1 is a top plan view of the sliding tube device in zero position.

Fig. 2 is a similar view of the device set in a different position.

Fig. 3 is a side elevation, partly in section of the device showing the relative position of the actuating arms.

Referring more particularly to the drawings, there is shown a sound proof box 1 with an outlet pipe 2 which branches out into two pipes 3 and 4. The pipes carry the sound, produced, by a suitable buzzer arrangement in the box 1, over two paths generally defined by pipes 4, 5, 6, 7 and 3, 8, 9, 10 to a suitable stethoscope or earphones 11 which are worn by the observer or pupil.

At the exact center of the system is a bearing 12 to which two arms 15 and 16 are attached. The arm 15, bearing a scale 14 is fastened by means of a clamp 13 to the sliding U pipes 18 and 18' fitted over the pipes 8 and 9 and 5 and 6. All of the curves of the pipes are symmetrical with respect to the bearing 12. It will be seen therefore, that any movement of the arm 15 shortens one path and lengthens the other by the same amount. This introduces a change in the length of the path to the two ears of the observer.

The second arm 16, which also has a bearing at 12 is fastened by means of a clamp 17 to the other two sliding U pipes 19 and 19'. The arm 16 is extended towards one side by a suitable pointer 21 which when the paths are equal rests above the zero mark of the scale regardless of the position of the arm bearing the scale.

The device as constructed and used in actual practice lies flat on a table and the movable part of the device, with the exception of the scale, is covered in such a manner as to prevent the operator, or pupil, from observing the position of the movable arms or judging by vision the relative lengths of the sound paths or tubes. The cover is also so placed that the instructor can see the scale and pointer, while the pupil cannot see same but must make settings by ear.

There are a number of points concerning the construction and use of the device which are considered in actual practice. Brass and copper tubing are used in making the apparatus, the larger size being ½" outside and .032" thick, the smaller size being $\frac{7}{16}$" outside and .032" thick. The tubing is worked down until the smaller size made a snug sliding fit in the larger. Care should be taken to change the cross section of the tubing only where absolutely needed; i. e., where one tubing had to slide in another. At these points the inside tubing is given a long bevel so that the change in cross section is not abrupt. Joints are made with the ends of the tubing butted tightly against each other so that no change of cross section occur there. The split in the tube leading from the sound-proof box is made by a long Y joint and as far as practicable there is no change made in the area of the cross section of the tubing at the joint. The sum of the cross sectional areas of the two branch tubes also equals the area of the single tube before it splits. Wherever the tubing is not straight, the curving is made very smoothly and gradually. The right angle changes in direction are made by bending the tubing in a quarter circle of 2" radius. All the above precautions are taken to avoid possibilities of changes in the phase or intensity as the sound passes thru the tubes. Reflections from the vicinity of the source of sound are avoided by enclosing it in a sound-proof box having walls of highly sound-absorbent material. In addition to this, any space within the box not occupied by the source of sound is packed with loose wall fibre.

The intensity at the two ears remains practically equal whatever be the setting of the arms. This follows from the fact that the drop per length of tubing of intensity of a sound passing through the tube is very small and, in addition to this, the change in length of the paths thru the tube is small when compared to the total length of the path. A constant difference in intensity at the ears can be produced by placing in one tube a very loose packing of wool fibre. If done with care, this packing does not seem to change the phase of the sound.

As used in training the operating is very simple. A source of sound, such as a noisy buzzer, is placed in the sound box 1. The observer puts on the stethoscope 11 and, by the use of his binaural sense, centers the sound in the medium plane by means of a handle on the arm 16. When centered, he notifies the instructor who notes the reading of the pointer on the scale 14 which is zero when the setting is perfect if the device is properly aligned in construction. The instructor then moves the arm 15 carrying the scale any amount in either direction. This changes the length of the two paths and the observer again equalizes them by moving his arm 14 of the device. A record kept by the recorder, shows the observer's errors and deviations from the correct setting.

The scale and pointer allows the measurement of the difference in length of the air paths through which the sound enters the two ears. A simple calculation transforms this measurement into microseconds. The length of paths is rapidly and easily changed by the recorder and is as readily changed by the observer.

The binaural variation at the ears due to change in length of paths is almost entirely due to a phase change in the sound and hence the device permits of investigation of the binaural sense involving phase change only. A simple method can be employed to introduce a constant intensity difference in the two ears which permits of investigation as to the effect on the median plane setting of unequal intensity at the two ears. The device is entirely mechanical and the sound undergoes no transformation through its travel to the ear.

I claim:

1. In a sound detection apparatus, a single source of sound, a pair of sound conveying members converged at said point of source, means attached to said conveyers to permit of aural reception by an observer, means for varying the relative lengths of said conveyers, and independent means operable by said observer for equalizing the lengths of said conveyers in accordance with his binaural observations.

2. In a sound detection apparatus, a single source of sound, a pair of tortuous sound conveying members converged at said point of source, means attached to said conveyers for aural reception by an observer, means for simultaneously lengthening one and correspondingly shortening the other of said conveyers, and independent means adapted to be actuated by the observer for equalizing the lengths of said conveyers in accordance with his binaural observations.

3. In a sound detection apparatus, a single source of sound, a pair of tortuous sound conveyers converged at said point of source, means attached to said conveyers for aural reception by an observer, sliding tubes mounted on the inner bends of said conveyers and forming a part thereof, means for actuating said sliding tubes for simultaneously lengthening one and correspondingly the other of said conveyers, and independently operated means adapted to be actuated by the observer for shifting said sliding tubes for equalizing the lengths of said conveyers in accordance with his binaural observations.

4. In a sound detection apparatus, a single source of sound, a pair of tortuous sound conveyers converged at said point of source, means attached to said conveyers for aural reception of said sound by an observer, sliding tubes mounted on the two forward and two rearward bends of said conveyers and forming a part thereof, a forward arm and a rearward arm operable independently thereof, said arms having a common pivot and being for the purpose of actuating said sliding tubes, said forward arm being adapted to be actuated unobserved visually by the observer for shifting said sliding tubes for varying the relative length of the paths of travel of sound through the two conveyers, the rearward arm being adapted to be actuated by the observer for oppositely shifting said sliding tubes to compensate for the shift of said tubes by said forward arm for the purpose of equalizing the paths of travel of sound in the two conveyers in accordance with the observer's binaural observations.

5. In a sound detection apparatus, a single source of sound, a pair of tortuous sound conveyers converged at said point of source, means attached to said conveyers for aural reception of said sound by an observer, sliding tubes mounted on the two forward and two rearward bends of said conveyers and forming a part thereof, a forward arm and a rearward arm operable independently thereof, said arms having a common pivot and being for the purpose of actuating said sliding tubes, said forward arm being adapted to be actuated unobserved visually by the observer for shifting said sliding tubes in either direction for varying the relative lengths of the paths of travel of sound through the two conveyers, the rearward arm being adapted to be actuated by the observer for shifting oppositely said sliding tubes to compensate for the shift of said tubes by said forward arm for the purpose of equalizing the paths of travel of sound in the two conveyers in accordance with the observer's binaural observations, and an indicating device for registering the degree of accuracy of the observer's setting of the rearward arm in opposed relation to the previous setting of said forward arm.

In testimony whereof I affix my signature.

LEON H. RICHMOND.